(Model.)
S. B. ROBBINS.
HARVESTER RAKE.
No. 271,124. Patented Jan. 23, 1883.
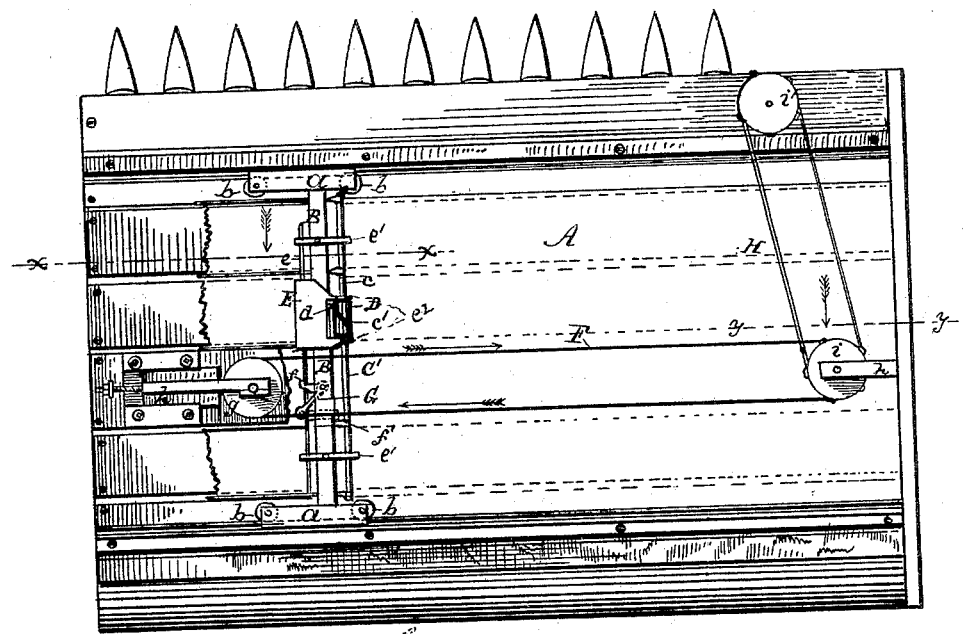
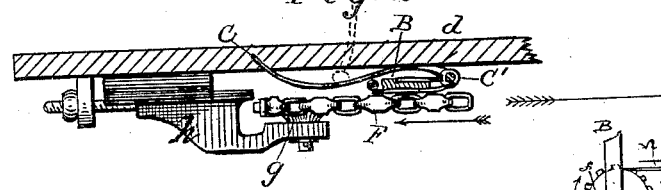
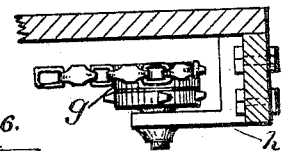
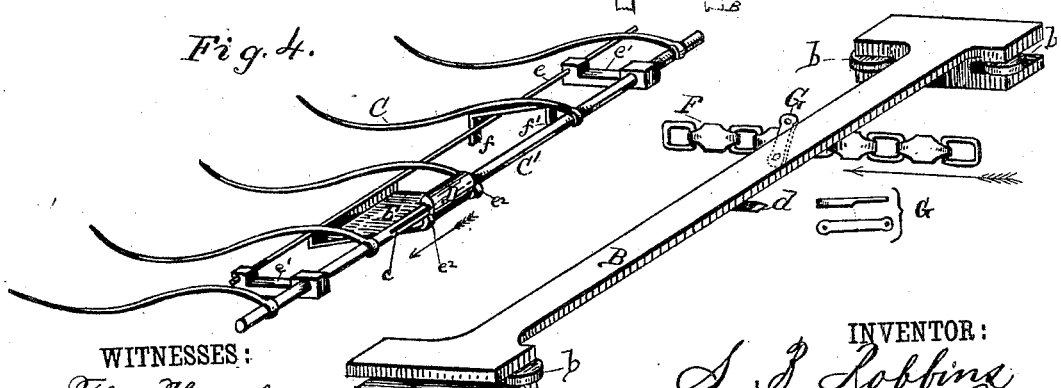
WITNESSES:
Thos Houghton.
John C. Kenon
INVENTOR:
S. B. Robbins
BY
ATTORNEYS.

UNITED STATES PATENT OFFICE.

SYLVAN B. ROBBINS, OF LAWRENCEBURG, INDIANA.

HARVESTER-RAKE.

SPECIFICATION forming part of Letters Patent No. 271,124, dated January 23, 1883.

Application filed June 10, 1882. (Model.)

*To all whom it may concern:*

Be it known that I, SYLVAN BALDWIN ROBBINS, of Lawrenceburg, in the county of Dearborn and State of Indiana, have invented a new and useful Improvement in Harvester-Rakes; and I do hereby declare that the following is a full, clear, and exact description of the same, reference being had to the accompanying drawings, forming a part of this specification.

This invention relates to improvements in rakes specially adapted for harvesters, and has for its object to obtain a powerful and positive action of the rake as it is raised and lowered, while at the same time to enable it to be held firmly as against the action or resistance of the grain being raked or formed into a gavel or bundle upon the gavel-platform.

The nature of my invention consists in the combination and arrangement of parts, substantially as hereinafter more fully set forth and claimed.

In the accompanying drawings, Figure 1 is an inverted view, partly broken away, of a gavel-platform of a harvester embodying my improvement. Fig. 2 is a section on line $x\,x$ of Fig. 1. Fig. 3 is a section on line $y\,y$ of the same figure. Figs. 4 and 5 are detailed views, respectively, of the rake and the traveling bar which carries the rake, with a section of its operating belt or chain connected to its lever also shown. Fig. 6 is a similar view of my invention.

In carrying out my invention I attach to the bottom of the gavel-platform two rails, A A, which face toward each other, and are so arranged as to provide a space between each rail and the under side of the platform.

B is a traveling bar or "carriage," having cross pieces or arms $a\,a$ at its ends, which are grooved or channeled to receive the rails A, upon which they travel.

To lessen friction and liability of the pieces or arms to bind upon the rails, as would be likely to take place when unequally pressed or acted upon at any point, the said cross pieces or arms are provided with rolls or disks $b$, bearing or moving upon the rails.

C is the rake, having its tines recurved inwardly at their outer ends and fixed to a head or rod, C′, hung and bearing in the cross pieces or arms $a$ of the carriage or bar B, and arranged crosswise of the under side of the gavel-platform. This head or rod is fitted with a sleeve, D, which has an endwise and a partially-rotary movement, said rod having a feather, $c$, which projects into a corresponding slot in the sleeve, and said sleeve having a spiral peripheral groove or slot, $c'$.

Into the peripheral or spiral groove of the sleeve D extends a projection or stud, $d$, on the carriage B, (see Figs. 1, 2, and 5,) to aid in imparting to the sleeve the aforesaid movements, whereby the rake is raised or lowered at the end of each movement of the carriage, it being held in an elevated position above the platform during the forward movement of the carriage.

E is a slide resting upon the carriage-bar B, and fixed to a rod, $e$, capable of sliding in bearings or perforated cross-bars $e'$, secured to the carriage-bar B. The slide E has arms $e^2$, which extend alongside the ends of the sleeve D, to act on it in moving it endwise upon the rake-head C′. The rod $e$ of the slide E has two cam-arms, $f\,f'$, near one end, one projecting directly therefrom and the other extended underneath the carriage-bar B and upwardly on the opposite side of the latter, as seen in Fig. 1. The function of these will be made apparent presently.

F is an endless chain or belt encompassing sprocket or rag wheels $g$, hung in brackets $h$, depending from the under side of the gavel-platform. One of these brackets is adjustable, as shown in Fig. 2, to permit tightening the belt as occasion may require. The chain or belt F is arranged in the direction of the length of the gavel-platform, and is connected to a link, G, pivoted to the carriage-bar B. This link has a shoulder on its inside to act on either one of the cam-arms $f\,f'$, as presently explained.

The rake-operating belt is driven by a belt or endless chain, H, passed around a second pulley or sprocket-wheel, $i$, on one of the aforesaid belt-pulley shafts, and a similar wheel or pulley, $i'$, on a shaft, $j$, which is driven by gearing or other suitable means of the harvester.

It will be seen that, assuming the rake to be at one side of the gavel-platform and motion to be imparted to the belt F, as the belt passes around the pulley or wheel at that end it will cause the link G to describe an arc which will cause the shoulder of the latter to strike one of the cams of the rod of the slide E. This action of the shoulder of the link upon the cam of the slide-rod will move the said slide transversely against and impart a like movement to the sleeve D, which will at the same time be partially rotated by the projection $d$ of the carriage-bar B. This operation of parts elevates the rake-teeth at the beginning of the forward movement of the rake, which enables the rake to act upon and rake up the grain on the gavel-platform preparatory to bundling or forming it into a gavel. When the rake has reached the opposite side of the gavel-platform, its movement will be arrested by mechanism it is not deemed here necessary to describe, to permit the binding of the grain. The rake is arrested sufficiently long to also allow the accumulation of a quantity of grain upon the platform, to be operated upon by the rake during another forward movement thereof to form a second gavel. After this, as motion is again imparted to the rake, the shoulder of the link will strike the opposite cam-arm, $f''$, Fig. 1, of the slide-rod, which will move the slide endwise and cause the partial rotation and also the endwise movement of the rake-head sleeve D. This will cause the rake-teeth to descend to the lower side of the gavel-platform to make its return movement.

The projection $d$ of the carriage-bar B fits squarely into the spiral slot $c'$ in the sleeve D, whereby the rake is held firmly as against the resistance or action of the grain being raked up. It will also be observed that a firm or powerful and positive action of the rake is obtained as it is raised and lowered. This is due to forming the ends of the slot $c'$ of the sleeve D with perpendicular walls, against which fits projection $d$, holding the rake firmly in either its upright or lowered position, so that no amount of pressure on the rake can change its position until sleeve D is made to move endwise on rake-head $C'$.

Having thus described my invention, what I claim, and desire to secure by Letters Patent, is—

1. In a harvester-rake, the combination of the traveling rake-carriage connected by a pivoted link to the actuating-chain, the rotary oscillating rake-head, the sleeve adapted to slide endwise on said rake-head, and provided with a spiral groove engaging with a projecting lug on said carriage, and the slide-rod provided with a forked arm engaging said sliding sleeve, and cam-arms engaging said link, as and for the purpose set forth.

2. In combination with the rake-head, the sleeve, the sliding rod, and forked arm, all constructed and arranged to operate as described, the platform having guide-rails on its under side, and the traveling bar or rake-carriage connected to the driving-chain by a pivoted link, and provided at its ends with cross-arms or guide-pieces adapted to slide on said rails, as shown and described.

SYLVAN B. ROBBINS.

Witnesses:
SOLON C. KEMON,
JOHN T. LAWRENCE.